UNITED STATES PATENT OFFICE.

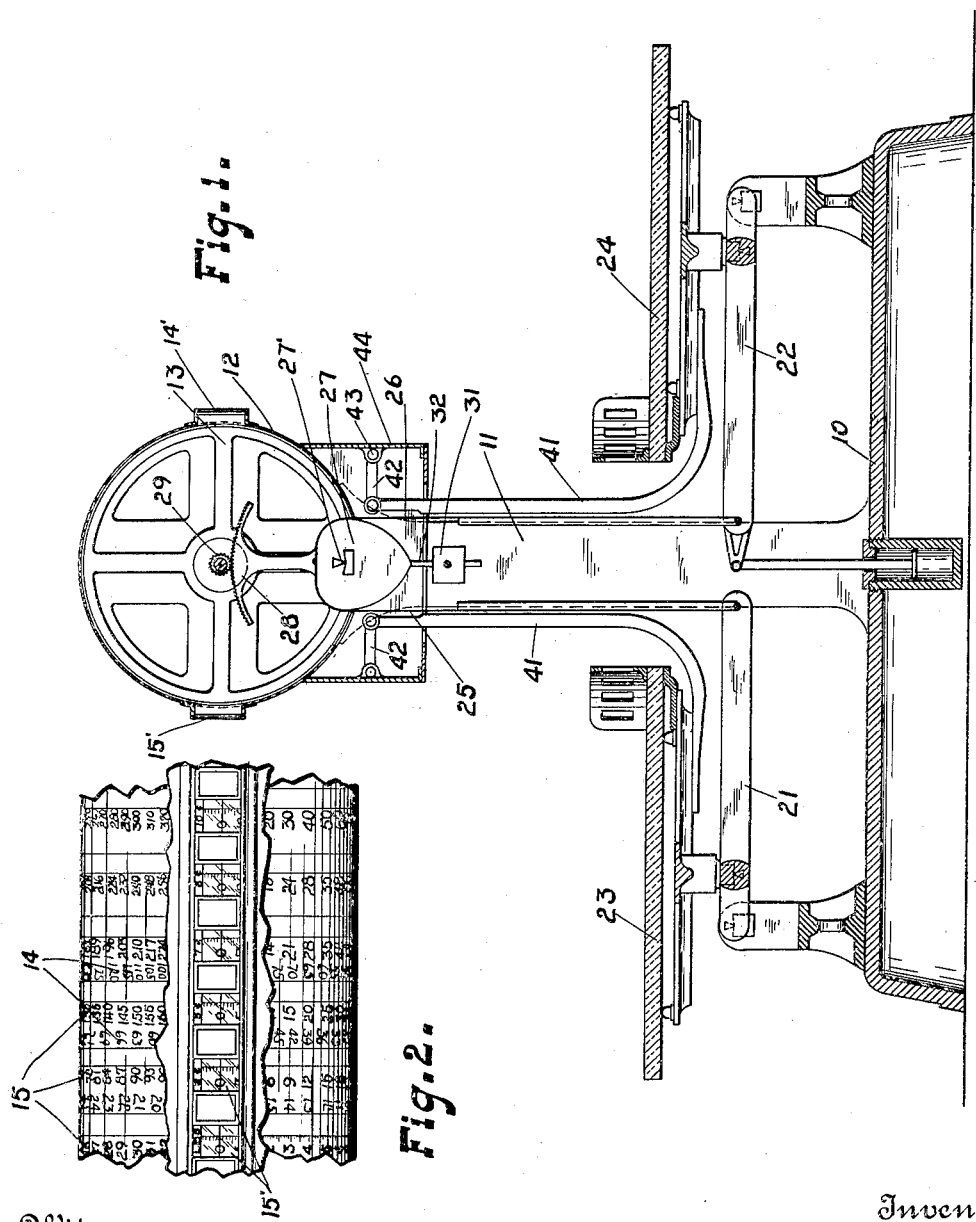

FRANK P. DUNN, OF ANDERSON, INDIANA, ASSIGNOR TO THE ANDERSON TOOL COMPANY, OF ANDERSON, INDIANA, A CORPORATION OF INDIANA.

DOUBLE SCALE.

1,012,339.      Specification of Letters Patent.      Patented Dec. 19, 1911.

Application filed March 6, 1909. Serial No. 481,690.

*To all whom it may concern:*

Be it known that I, FRANK P. DUNN, a citizen of the United States, residing at Anderson, in the county of Madison and State of Indiana, have invented certain new and useful Improvements in Double Scales, of which the following is a specification.

In a great many provision stores it is customary to have a counter arranged across the room in order to cut off the "meat shop" from the rest of the store, even where all the service is performed by a single person, and heretofore it has been necessary, for convenience, to provide two weighing scales, one for the meat counter and the other for the dispensing of groceries because, under most conditions the meat scale has a platform which is generally in such condition, though clean, that it will stain paper sacks in which groceries are placed. To meet this condition it has heretofore been proposed to mount a weighing scale upon a vertical pivot at its base so that the entire scale may be swung around and thus be conveniently operated from either side of the counter but this does not obviate the objection heretofore stated to the use of a meat dispensing scale for dispensing other articles.

The object of my invention is, therefore, to produce a scale of such character that it may be readily operated from either side of a counter and to this end consists fundamentally in the provision of a pair of receiving platforms one counterbalancing the other, and connected to a single indicator which is so constructed as to indicate values or weights of material placed upon either one of the receiving platforms.

The accompanying drawings illustrate my invention.

Figure 1 is a vertical section through the two platforms; Fig. 2 an elevation of one side of the indicator drum.

In the drawings, 10 indicates a suitable supporting base having side arms 11 which support a drum casing 12 at their upper ends. Journaled within the drum casing 12 is an indicator drum 13 provided upon its face with two sets of indicator markings 14 and 15 which read in opposite directions, for a reason which will appear. Casing 12 is provided at each side with sight openings 14' and 15' which register with the markings 14 and 15 respectively. Mounted upon base 10 upon opposite sides of the axis of drum 13 are two scale beams 21 and 22 which support receiving platforms 23 and 24, respectively, each of said platforms being suitably mounted for parallel motion, in any desired and well known manner. The two scale beams 21 and 22 are balanced against each other by any convenient means which, in the present instance, comprises a pair of tapes 25 and 26 connected respectively to beams 21 and 22 and also connected to a cam 27 supported upon suitable knife edges 27', the long dimension of the cam normally lying between the two tapes 25 and 26. Connected to cam 27, is a segmental gear 28 which is meshed with a pinion 29 carried by drum 13, the arrangement being such that a swing of gear 28 to its extreme toward either side of its normal medial position will produce a complete or substantially complete rotation of drum 13. In order to obtain the best results beams 21 and 22 should be either in alinement or parallel when there is no weight upon either platform. The graduations 14 are provided for use in indicating the condition of platform 24 and the graduations 15 are used in conjunction with platform 23.

In operation the scale will be placed upon a counter with the platform 23 accessible from one side of the counter and platform 24 accessible from the other side of the counter so that one may be used exclusively for meats while the other is used exclusively for groceries. It is of course to be understood that the device is fully as useful in many other kinds of stores.

While the mere counterbalancing of one weight beam by the other, in the manner shown will produce an operative structure, yet, in practice, in order that the scale may have as wide a range of usefulness as possible with as small a movement of the beams as is consistent with accuracy of weighing, I deem it advisable, in scales of large capacity, to provide a counterweight 31 which is carried by an arm 32 rigidly depending from the axis of cam 27 and movable upwardly from its medial position in either direction in opposition to the scale beams. In practice this weight should be displaced from the vertical plane of the two tapes 25 and 26 in order not to interfere with the said tapes as the cam rocks.

It is to be understood that the invention thus far described may be embodied in a structure wherein the platforms are guided by the well known construction where the platform is provided with a depending arm extending below the supporting beam and connected by a parallel-motion link to maintain a horizontal position of the beam. It is desirable however, that the platforms be as close to the counter as possible in order that articles need not be lifted very high to be deposited upon the platforms. It is also desirable that the entire structure from the outer edge of one platform to the outer edge of the other platform be as short as possible consistent with platforms of required area and for this purpose it is desirable that the beams be as short as possible. I have therefore illustrated my invention as embodied in a structure wherein the platforms are supported upon the beams between the fulcrum of the beam and the point of connection between the beam and the counterbalancing mechanism and have also located these beams very close to the supporting base. As a consequence the platforms could not be maintained in horizontal position by members extending below the beam and I have therefore provided each platform, at its inner edge or end, with a stiff upwardly extending arm or bar 41 which, at its upper end, is pivotally connected with a link 42 said link being pivoted at 43 within a casing 44 which forms a part of the casing 12 and incloses the cam 27 and connected parts. Link 42 has a length equal to the distance between the fulcrum of the scale beam and the point of engagement of the platform with said scale beam and the length of the upwardly extending arm 41 is such as to hold link 42 parallel with a corresponding scale beam so that the platform will be held in a horizontal position throughout the range of swing of the supporting scale beam.

It will be readily understood that the capacity of the scale may be raised by adding weights to one platform to counterbalance an applied load on the other platform.

I claim as my invention:—

1. A weighing scale including a pair of separate beams each carrying a load receiving platform, a rotary drum indicator above said beams, a single oscillating means for actuating said indicator, and means connecting each of said beams with the opposite sides of said indicator actuating means, whereby the beams will tend to actuate the indicator in opposite directions.

2. A weighing scale including a pair of separate beams each carrying a load receiving platform, an oscillatory indicator, a single oscillating means for actuating said indicator, and a strap connection between each of said beams and the opposite sides of said indicator actuating means.

3. A weighing scale including a pair of separate beams each carrying a load receiving platform, a rotary drum indicator above said beams, a single oscillating means for actuating said indicator, a pendulum-like weight suspended from said indicator actuating means, and means connecting each of said beams with the opposite sides of said indicator actuating means.

4. In a weighing scale, the combination of a pair of separate beams each carrying a receiving platform, a rotatable indicator drum, an oscillating cam, means carried by said cam for rotating the drum in either direction, and a pair of straps each connected to the cam and to one of the beams, whereby said beams are balanced one against the other and both connected to the indicator drum.

5. A weighing scale including a pair of separate beams each carrying a load receiving platform, a single oscillatable indicator provided with two sets of indications readable from opposite sides of the indicator, means for actuating said indicator in either direction, an oscillatory counterweight suspending from said indicator actuating means, and a strap connection between said indicator actuating means and each beam.

6. A weighing scale including a pair of separate beams each carrying a load receiving platform, a rotatable indicator drum located above a point between the beams and having two sets of indications readable from opposite sides thereof, means for actuating said drum in either direction, a counterweight suspending from said indicator drum actuating means, and a flexible connection from the opposite sides of the indicator drum actuating means and said beams.

7. In a weighing scale, the combination with a pair of separate beams each carrying a receiving platform, a single rotatable indicator drum provided with two sets of indications readable from opposite sides thereof, intermediate connections between said rotatable drum and the two beams for rotating said drum in either direction, and a swinging counterbalance weight connected with said connections between the beams and drum and movable upwardly in either direction from a normal depending position in opposition to an applied load on either platform.

8. In a weighing scale, the combination with a pair of separate beams each carrying a receiving platform, a single rotatable indicator drum arranged between the two platforms and provided with two sets of indicators readable from opposite sides thereof, intermediate connections between said rotating drum and the two beams for rotating said drum in either direction, and a swinging counterbalance weight connected with said connections between the beams and drum and movable upwardly in either direction from a normal depending position in opposition to an applied load on either platform.

9. A weighing scale including a pair of separate beams each carrying a load receiving platform, an oscillatory indicator, means for actuating the same in either direction, a swinging counterbalance weight connected with said actuating means and movable upwardly in either direction from a normal depending position in opposition to an applied load on either platform, and a non-gear connection between the beams and said indicator actuating means for moving the same and swinging the counterbalance in opposite directions from normal.

10. In a weighing scale, the combination of a pair of separate beams each carrying a receiving platform, a rotatable indicator drum, an oscillating cam, means carried by said cam for rotating the drum in either direction, a pair of straps each connected to the cam and to one of the beams, whereby said beams are balanced one against the other and both connected to the indicator drum, and a swinging counterbalance weight connected to the two beams and movable upwardly in either direction from a normal depending position in opposition to an applied load on either of the platforms.

11. In a weighing scale, the combination, of a suitable supporting base, a pair of scale beams mounted thereon, an indicator drum arranged above said beams, intermediate connections between said beams and said indicator drum whereby loads applied to said beams will cause a movement of the indicator in opposite directions, two platforms each supported upon one of said beams, two upwardly extending arms each secured at its lower end to one of the platforms, and two guide links each pivotally mounted upon a suitable stationary support and pivotally connected to the upper end of the upwardly extending arm of one of the platforms.

12. In a weighing scale, the combination, of a suitable supporting base, a pair of scale beams mounted thereon, an indicator drum arranged above and between said beams on an axis substantially parallel to the axis of the beams, intermediate connections between said beams and said indicator drum whereby loads applied to said beams will cause a movement of the indicator in opposite directions, two platforms each supported upon one of said beams, two upwardly extending arms each secured at its lower end to one of the platforms, and two guide links each pivotally mounted upon a suitable stationary support and pivotally connected to the upper end of the upwardly extending arm of one of the platforms.

13. In a weighing scale, the combination, of a suitable supporting base, a pair of scale beams mounted thereon, an indicator drum arranged above said beams, intermediate connections between said beams and said indicator drum whereby loads applied to said beams will cause a movement of the indicator in opposite directions, two platforms each supported upon one of said beams between the fulcrum thereof and the point of connection between such beam and the other beam, two upwardly extending arms each secured at its lower end to one of the platforms, and two guide links each pivotally mounted upon a suitable stationary support and pivotally connected to the upper end of the upwardly extending arm of the platforms.

14. In a weighing scale, the combination, of a suitable supporting base, a pair of scale beams mounted thereon, an indicator drum arranged above and between said beams on an axis substantially parallel to the axis of the beams, intermediate connections between said beams and said indicator drum whereby loads applied to said beams will cause a movement of the indicator in opposite directions, two platforms each supported upon one of said beams between the fulcrum thereof and the point of connection between such beam and the other beam, two upwardly extending arms each secured at its lower end to one of the platforms, and two guide links each pivotally mounted upon a suitable stationary support and pivotally connected to the upper end of the upwardly extending arm of one of the platforms.

15. In a weighing scale, the combination of a suitable supporting base, a pair of scale beams mounted thereon, two platforms each supported from one of said beams, two upwardly extending arms each secured at its lower end to one of the platforms, two guide links each pivotally mounted upon a suitably stationed support and pivotally connected to the upper end of the upwardly extending arm of one of the platforms, a counterbalance connected by non-gear connections to act upon two beams, and indicating mechanism connected to the two beams.

In witness whereof, I have hereunto set my hand and seal at Anderson, Indiana, this 3rd day of March, A. D. one thousand nine hundred and nine.

FRANK P. DUNN. [L. S.]

Witnesses:
B. D. EMANUEL,
J. D. HOPPER.